(12) United States Patent
Groh (10) Patent No.: US 7,744,109 B2
(45) Date of Patent: Jun. 29, 2010

(54) METHOD AND APPARATUS FOR ALIGNING A TRAILER HITCH

(76) Inventor: Ortwin W. Groh, 7244 Evans Road, Chilliwack, BC (CA) V2R 1L1

( * ) Notice: Subject to any disclaimer, the term of this patent is extended or adjusted under 35 U.S.C. 154(b) by 2 days.

(21) Appl. No.: 11/911,530

(22) PCT Filed: Apr. 18, 2006

(86) PCT No.: PCT/CA2006/000607

§ 371 (c)(1),
(2), (4) Date: Feb. 19, 2008

(87) PCT Pub. No.: WO2006/108303

PCT Pub. Date: Oct. 19, 2006

(65) Prior Publication Data

US 2009/0108563 A1 Apr. 30, 2009

(30) Foreign Application Priority Data

Apr. 14, 2005 (CA) .................................... 2504986

(51) Int. Cl.
*B60D 1/36* (2006.01)
(52) U.S. Cl. .................................... 280/477; 280/478.1
(58) Field of Classification Search ................. 280/477, 280/478.1; 359/871
See application file for complete search history.

(56) References Cited

U.S. PATENT DOCUMENTS

| 4,285,138 A | 8/1981 | Berry |
| 4,627,634 A | 12/1986 | Coleman |

(Continued)

FOREIGN PATENT DOCUMENTS

CA 2100375 7/1993

(Continued)

*Primary Examiner*—Lesley Morris
*Assistant Examiner*—Tashiana Adams
(74) *Attorney, Agent, or Firm*—Antoinette M. Tease (57) ABSTRACT

The present invention relates to a method and apparatus for assisting a driver of a towing vehicle to reverse the vehicle into alignment and proximity with a trailer, so that the towing vehicle and the trailer can be easily hitched together. The invention includes a detachable alignment system with a signal device to show a stop point via side mirrors to the driver while he is reversing the vehicle toward the trailer. The invention includes two complementary units respectively releasably attached to the vehicle and trailer, each unit having equal-length transverse support beams that respectively extend beyond the sides of the vehicle and trailer and that have visible markers depending from their distal ends, whereby the markers are visible to the driver via the side view mirrors. Being of equal length, the distal ends of support beams on either side of the vehicle and trailer permit the end markers to visually line up or come together as viewed by the driver through the side view mirrors when a tow ball on the vehicle and a trailer hitch on the trailer are accurately lined up for a positive connection. The markers permit the driver to align the vehicle unit to the trailer unit while reversing the vehicle, and therefore align the tow ball to the trailer hitch as those units are mounted to these parts specifically and respectively. A trigger switch on the trailer unit may be deployed to activate a signal device, for example a light, when in contact with the tow ball.

4 Claims, 2 Drawing Sheets

U.S. PATENT DOCUMENTS

| | | |
|---|---|---|
| 4,687,220 A | 8/1987 | Danielson |
| 4,856,200 A | 8/1989 | Riggs |
| 5,035,441 A | 7/1991 | Murray |
| 5,036,593 A | 8/1991 | Collier |
| 5,113,588 A * | 5/1992 | Walston .................. 33/264 |
| 5,115,572 A | 5/1992 | Harbison |
| 5,224,270 A | 7/1993 | Burrus |
| 5,274,432 A | 12/1993 | Parent |
| 5,309,289 A | 5/1994 | Johnson |
| 5,338,047 A | 8/1994 | Knisley |
| 5,478,101 A | 12/1995 | Roberson |
| 5,482,310 A | 1/1996 | Staggs |
| 5,558,352 A | 9/1996 | Mills |
| 5,669,621 A | 9/1997 | Lockwood |
| 5,680,706 A | 10/1997 | Talcott |
| 5,951,035 A | 9/1999 | Phillips, Jr. et al. |
| 5,970,619 A | 10/1999 | Wells |
| 5,971,555 A | 10/1999 | Wilcox et al. |
| 5,979,927 A | 11/1999 | Hale |
| 6,022,116 A | 2/2000 | Osborn |
| 6,102,423 A | 5/2000 | Beck et al. |
| 6,076,847 A | 6/2000 | Thornton |
| 6,279,940 B1 | 8/2001 | Beavington |
| 6,357,126 B1 | 3/2002 | Gillen, Jr. |
| 6,422,585 B1 | 7/2002 | Glass |
| 6,454,290 B1 | 9/2002 | Turner |
| 6,480,104 B1 | 11/2002 | Wall et al. |
| 6,557,483 B2 | 5/2003 | Nathan |
| 6,585,281 B1 * | 7/2003 | Voorting .................. 280/477 |
| 6,612,603 B2 | 9/2003 | Alger |
| 6,712,378 B1 | 3/2004 | Austin |
| 6,764,091 B1 | 7/2004 | Grasso |
| 6,820,888 B1 | 11/2004 | Griffin |
| 6,827,363 B1 * | 12/2004 | Amerson .................. 280/477 |
| 6,834,878 B2 * | 12/2004 | Koestler .................. 280/477 |
| 7,171,773 B2 * | 2/2007 | Haggard, Jr. ................ 40/591 |
| 7,207,589 B2 * | 4/2007 | Givens .................. 280/477 |

FOREIGN PATENT DOCUMENTS

| | | |
|---|---|---|
| CA | 2307405 | 2/2001 |
| WO | WO 91/10580 | 7/1991 |

* cited by examiner

METHOD AND APPARATUS FOR ALIGNING A TRAILER HITCH

CROSS REFERENCE TO RELATED APPLICATIONS

This application claims priority from Canadian Patent Application Serial Number CA2504986 filed on Apr. 14, 2005, entitled "Hitch Alignment Device".

BACKGROUND

1. Field

The present invention generally relates to tow vehicles and drawn trailers and, more particularly, to removable visual devices used to assist a tow vehicle operator to align the vehicle's tow hitch assembly to the trailer's hitch receiver assembly, in most cases a tow ball and trailer hitch respectively, however embodiments can be fashioned to work with pintle hitches or other tow vehicle to trailer hitching mechanisms.

2. Description of Related Art

There are many methods and apparatuses devised to assist a vehicle operator when reversing a vehicle to align the vehicle's ball to a trailer hitch assembly for the purpose of coupling. Prior devices have been either costly, complex, time consuming for assembly or disassembly, or for single purpose, and most rely on an unobstructed view from the interior of the tow vehicle's rear view mirror.

Relying on the rear view mirror of the operator's vehicle seriously limits the effectiveness of such devices, since a direct line of sight from the mirror through the back window to the alignment indicators of these devices can be compromised by the presence of people or goods in the back seat, or obstacles within or at the back of the truck bed, or by vehicles that have no such rear window at all. This compromised line of sight prevents such devices from working effectively or even at all.

Such shortcomings can be seen in CA23007405 (THORNTON) (related to U.S. Pat. No. 6,076,847), U.S. Pat. No. 6,612,603 (ALGER), U.S. Pat. No. 6,557,483 (NATHAN), U.S. Pat. No. 6,712,378 (AUSTIN), U.S. Pat. No. 6,764,091 (GRASSO), U.S. Pat. No. 6,454,290 (TURNER), U.S. Pat. No. 6,422,582 (GLASS), U.S. Pat. No. 6,357,126 (GILLEN, Jr.), U.S. Pat. No. 6,279,940 (BEAVINGTON), U.S. Pat. No. 6,102,423 (BECK), U.S. Pat. No. 6,022,116 (OSBORN), U.S. Pat. No. 5,979,927 (HALE), U.S. Pat. No. 5,971,555 (WILCOX), U.S. Pat. No. 5,680,706 (TALCOTT), U.S. Pat. No. 5,669,621 (LOCKWOOD), U.S. Pat. No. 5,558,352 (MILLS), U.S. Pat. No. 5,482,310 (STAGGS), U.S. Pat. No. 5,478,101 (ROBERSON), U.S. Pat. No. 5,309,289 (JOHNSON), U.S. Pat. No. 5,036,593 (COLLIER), U.S. Pat. No. 5,035,441 (MURRAY), U.S. Pat. No. 4,856,200 (EMERICK), and U.S. Pat. No. 4,285,138 (BERRY).

A solution that utilizes the side view mirrors, so that vision of alignment indicators cannot be compromised by objects in the vehicle, or for a lack of a sightline through the vehicle to the indicators, would be a more effective method. In addition, the built-in redundancy in having two, rather than one line of sight for alignment can be seen as a positive improvement on the performance of the task.

CA2100375 (KNISLEY) (related to U.S. Pat. No. 5,338,047) describes a direction-orientable wheeled-body device having a socket to receive the lower end of a trailer's vertical tongue jack, configured such that movement of the wheel aligns the trailer's hitch socket with the hitch ball of a towing vehicle. Wheel movement is achieved by rotation of a gear in engagement with the wheel. Unfortunately, this device would require physical exertion by the user to move the trailer into alignment with the tow vehicle, such exertion varying with grade and load of the trailer. This process could possibly be a detriment to a person with little physical ability.

U.S. Pat. No. 5,224,270 (BURRUS) describes a removable alignment device using an operator's side mirror to align crosshair elements of the tow vehicle to the trailer. The device lacks consistent positioning between elements on the vehicle to elements on the trailer for accurate setup, lacks an identifier for a stop point while reversing toward a target at the point where the ball and hitch meet for coupling, and lacks means for accurate alignment as the crosshair element mounted to the rear view mirror prevents the user from having the accurate depth perception required to anticipate where the ball of the vehicle would meet the hitch of the trailer, especially at angles of attack wherein the general axes of the vehicle and trailer are not in line with each other. A better solution would be to allow the operator to see markers for both the ball and hitch at their respective distance as seen through the rear view mirror for accurate depth perception and corresponding ability of the operator to anticipate the proper stop point.

U.S. Pat. No. 5,115,572 (HARBISON) describes an adjustable alignment device using cross members supported by the ground that are adjustable for alignment purposes. Alignment is achieved when the driver's side rear wheel is channeled along a forward member, and touches a cross member of the device. This device would require time-consuming adjustment for different types of vehicles and wheel sizes and does not show a definite stop point because of the difficulty to judge when the distal end of the rear tire touches a cross member while reversing without colliding the cross member or forward member that could cause damage to either the vehicle, its tires, or the invention. The product is cumbersome and complicated, is vulnerable to human error as there are no fixed references to either the tow ball or hitch, and can be knocked out of place or alignment or knocked down by the vehicle. There are no visual clues for the stop point, only the feeling the driver may experience when the rear tire or tires of the vehicle impacts the forward cross member of the invention.

U.S. Pat. No. 5,113,588 (WALSTON) describes an alignment device that may be used with the interior rear view mirror or a single side mirror. The invention uses two sighting elements fastened by magnets to respectively the rear of the towing vehicle and tongue of the towed vehicle, upon which are mounted rings that when brought together form a toroid to indicate alignment; the differences of height between the rear of the towing vehicle and the towed vehicle tongue would require height adjustment susceptible to human error between male and female sighting elements as while setting up the operator must align the two elements at a specific height based on the operator's prediction as to where the elements will meet in a manner that they are substantially overlaid when the towing vehicle and the towed vehicle are brought together.

Positions that must be viewed from the rear view mirror can be compromised by obstacles in the rear view mirror or by vehicles with no rear view mirror at all. In positions where the sighting elements are positioned to any degree horizontally the accuracy of the length adjustment is particularly subject to human error as the device must be extended beyond the width of the vehicle, and as such must be retractable from a closed position if stored in the trunk of a vehicle, and the extensible arms of both the vehicle and trailer extension rods must be supported by a single pivoting socket point without other means of support or counterweight to ensure that the targets are in proper and anticipated position despite the influence of gravity causing the ends to sag or causing the entire device from torquing from a moment at the pivoting socket.

This method of alignment doesn't take into consideration the unevenness of the terrain which may make aligning the sighting elements difficult. Nor does it provide an accurate guide to bring the operator to the point that the elements are substantially overlaid, especially when viewed through the side view mirrors where the elements are relatively at an angle from a vertical center line of the vehicle as seen from the rear view mirror where the operator is approaching the sighting element on the trailer from angle of attack wherein a plane aligned with a centerline drawn through the vehicle perpendicular to the ground is not coincident to a plane aligned with a centerline drawn through the trailer perpendicular to the ground, because approaching the sighting element on the trailer with the sighting on the vehicle does not ensure that the ball and hitch are following a parallel path to the path between the sighting elements and the direction of the vehicle so guiding them together so that the ball and hitch meet at a stop point where they can be joined. The ultimate goal is to join the ball and hitch, not bring the sighting elements together, which this invention does not achieve accurately. Another downside is the magnetic fastening means for this unit since there are many new composite and plastic materials in styles of bumpers on present or future vehicles which will not adhere to a magnet.

U.S. Pat. No. 4,687,220 (DANIELSON) describes a detachable signaling device with telescoping members that signals when it contacts a trailer, whose intention it is to visually indicate the alignment of the hitch elements; however, the device projects longitudinally and only functions properly when the longitudinal axes of the tow vehicle and trailer are perfectly lined up, and only then provides a signal that the hitch elements are at the proper distance to one another longitudinally and makes no reference to lateral alignment to center the tow vehicle to the trailer so that the hitch elements actually meet.

A complicated system of suction cups and brackets are available to fasten the system to the tow vehicle in order to allow the device to be positioned in a manner so as to hit the trailer on a surface when reversing, but doesn't account for potential unavailability of tow vehicle surfaces to mount to that will allow the device to touch a trailer, such as a trailer that is lower and narrower than mountable surfaces of the tow vehicle. The suction cups are seen as inferior mounting means as the likely presence of dirt, silt, water, rain, snow, ice, frost, paint irregularities, rust, dents, or irregularities in the form of the car surface will cause the suction cups to fail.

The tail end of the invention intended to touch an impact strip on the trailer moves toward the trailer like a lance and could pierce the impact strip if the driver reverses too quickly, damaging either the invention or the trailer, and likely knocking the invention off of its suction cup mounts. Different styles of trailers would consistently create new adjustment points to the operator. Given a situation where the invention was not previously calibrated to a trailer already hitched to a tow vehicle, assembly and accuracy of the device would be highly prone to human error.

U.S. Pat. No. 5,951,035 (PHILLIPS, Jr.) describes an alignment system using a photoelectric sensor and alerting device. This device shows modification to the ball assembly which may be costly and take away from the integrity and strength of the ball unit of the tow vehicle. The device shows no other means for alignment except when the ball unit is already aligned to the hitch assembly of the trailer and therefore does not function as a guide to bring the two vehicles to this alignment. The device is intended only for ball and socket type hitch assemblies.

U.S. Pat. No. 6,480,104 (WALL) describes the use of a number of ultrasonic transducers being transmitted to a control unit. This device is time consuming and complicated to set up, limits use, requires proper surfaces for mounting, and the transducers could be subject to damage from the environment, road debris, or accident, or to loss or theft if left mounted.

Wireless transducers, as in the preferred embodiment, require a power source that might not always be available, as in the case of failed batteries, and as such batteries are disposable will create waste hazardous to the environment. When the power source is derived from a hook-up, the user must remember to do so, make the effort to do so, and deal with cumbersome lengths of wire that the user will have to remember where they were stored, or that could be damaged if left in place, such as on the rear of the vehicle. Wires that access the transducers in a concealed manner generally must pass through user drilled holes in the car body, potentially damaging the integrity of the car body.

Learning to use the device and making a mental picture of the events appearing on the display of the handheld device and correlating them to events and movement of the vehicle happening in real time in the real world behind the user may be difficult for users, compared to actually seeing visual references of alignment on the vehicle and trailer themselves. Relying on the display and not visual references through the rear view mirrors could lead to an accident when reversing.

U.S. Pat. No. 5,274,432 (PARENT) describes an alignment monitoring system using side markers on the vehicle and trailer for observing alignment of a towed vehicle while traveling where the driver cannot see the towed vehicle through the side view mirrors. The markers are fixed to the vehicle and trailer for observation in transit only, and are not intended to facilitate aligning a vehicle and trailer for purposes of coupling the ball and hitch of those vehicles respectively. The device has lights and reflective surfaces to allow it to be seen at night, but these function as visual references and not signals that turn on and off to show whether the coupling elements are at a stop point. This device does not have any indicator of when the tow vehicle ball is aligned to the trailer hitch socket at a stop point as this is not the intention of the invention.

Accordingly, a better solution not encumbered by the foregoing limitations would be desirable.

SUMMARY OF THE INVENTION

The present invention is directed to this need.

One aspect of the invention provides a tow-vehicle-to-trailer (or towed vehicle) alignment system with a signal device indicating a stop point that first allows a driver to correctly align hitch fastening means on the tow vehicle, generally a tow ball (hereafter "tow ball" or simply "ball"), and the hitch fastening means on the trailer, generally a socket in a metal tongue (hereafter "hitch"), when reversing the vehicle and secondly to indicate a stop point where the ball and hitch are in position to fasten together where the driver should stop the vehicle, at which point the hitch fastening means on both vehicles can be coupled.

The system utilizes two detachable alignment units, a tow vehicle unit mountable to the posterior end of the tow vehicle and a trailer unit mounted to the anterior end of the trailer in proximity of their respective hitch fastening means to align the tow vehicle hitch fastening means with the trailer hitch fastening means, generally a ball and hitch.

Both units comprise equal length support arms that extend transversely to a point beyond the sides of the vehicle where the distal ends on either side can be seen through the respective side view mirrors, which upon said distal ends are located visible markers. Being equal length ensures that the units are well balanced and that prevents a moment at the arms from torquing the units at centrally located mounting points; the equal length also permits the markers to align or otherwise come together when the units are in proximity of each other when used correctly.

The markers at either end of the arms of the tow vehicle unit and trailer unit are used by the driver of the vehicle to align the tow vehicle to the trailer (or towed vehicle) to permit guiding the steering of the driver of a reversing tow vehicle to correctly position the tow ball directly under the trailer hitch at a stop point. The left hand markers and the right hand markers of the tow vehicle unit and the trailer unit are respectively lined up as seen through the left and right side view mirrors by the driver when the tow ball has reached the stop point below the trailer hitch where they are in position to be coupled.

In a portable and removable embodiment of the invention wherein the hitch fastening means are a ball and hitch, a tow vehicle unit utilizes a friction fit clip on the ball neck centrally supporting equal length support arms that extend transversely to either side as described. The trailer unit is supported by a centrally located adjustable friction fit clip mounted to the hitch. The trailer unit may also include a trigger positioned to detect that the ball has been received at the stop point. In this configuration, it is desirable to have the trailer unit fastened below the hitch in the path of the ball as it approaches the stop point and in fact desirable to have the majority of the tow vehicle unit below the ball itself, and therefore below the trailer unit, so that the ball may freely activate the trigger without portions of the units colliding each other.

In this regard, the markers on the vehicle unit may be generally oriented downwards and the markers on the trailer unit generally oriented upwards so as not to touch each other when brought in proximity to one another and to avoid collision which may damage or disengage the mounting of the units. In any embodiment, mounting the two units such that the support arms are at different heights is advantageous so there is no issue with them colliding when the tow vehicle reverses to the trailer. Other embodiments, such as having a permanent mounting of the units by way of screwed, riveted, or welded brackets are possible. In either case, collapsibility of the units into a compact form for stowage is desirable.

The markers function as a guide in two ways. First the driver simply has to orient the tow vehicle such that the markers on the trailer appear between the markers on the tow vehicle, which is simple to achieve because of the distance between the tow vehicle unit and the trailer unit when commencing the activity of aligning them allows for diminishing perspective of the object farther away—the trailer unit—as it appears visually smaller to the driver through the side view mirrors than the tow vehicle unit closer to the driver. It is easy for the driver to grossly position the markers on the trailer unit between the markers on the tow vehicle unit.

When this principal alignment is achieved, the driver is now in the correct position, and the second method of aligning the markers of the two units comes into play. The driver reverses, all the while maintaining the trailer unit markers between the tow vehicle markers until the point when the two sets of markers appear relatively in line with one another as the distance between them and corresponding effect of perspective diminishes. When the two sets of markers are nominally the same size and the left and right markers of the corresponding units are respectively in line with one another as seen through the side view mirrors, a stop point has been achieved where the hitch fastening means on the tow vehicle, generally a tow ball and the hitch fastening means on the trailer, generally a socket in a metal tongue, are in place for coupling. In essence, the markers on the tow vehicle unit indicate a datum position of the tow ball, and the markers on the trailer unit indicates a datum position of the hitch, and the driver uses these markers as references to bring the two data together, whereby the tow ball has reached the stop point where it can be coupled with the hitch.

The device can be devised such that the corresponding left and right markers touch each when the stop point is achieved, or where the forward one covers the other when brought into proximity to each other at the stop point, or where one is higher than the other such that when brought together they appear at the same distance to the driver at the stop point as viewed through the side view mirrors, or any other method to further indicate the proper stop-point.

A further method to more accurately indicate the stop point would be to have a signaling device that activates when the ball and hitch are in proper place to connect that is triggered by the close and proper proximity of the two. One method of devising the signaling device is to have a trigger underneath the hitch that is struck by the ball when the stop point has been achieved. The trigger then activates the signal, indicating to the driver the stop point has been achieved. The signal could be a sound, a light being activated, a message on an onboard console, or a mechanical flag that is raised by tension on a string attached to the trigger. The preferred embodiment of the invention would have strong LED lights at the distal ends of the trailer unit that would illuminate when the trigger switch is struck and would be visible by the driver through the side view mirrors.

Since the ball and hitch assembly permits tolerances of accuracy, that is a range of positions the ball could be in relation to the hitch to permit accurate coupling, the signaling device would benefit by having a target for a trigger switch relatively the size of the allowable range such that the ball could strike anywhere on this target to indicate a stop point. The target as such could be a paddle that triggers an electromechanical switch when struck. The target can be designed to absorb impact from the force of the vehicle at the ball so as not to damage the trigger or switch.

A paddle located below the hitch connected to the trailer unit is deployed to act as a target for the trigger switch that activates the signal device visible to the operator when the tow vehicle ball contacts it to signal the stop point whereat the tow ball is correctly positioned directly under the hitch to facilitate connecting the two. The signal device may be a light that illuminates when the paddle is depressed. Another portion of the signal device may be used to aid in alignment in different atmospheric conditions like fog with the signal acting as a flashing beacon to aid the operator in locating the device at distances while reversing. Such flashing beacons could appear on the distal ends of either unit, and would serve as markers for the driver; when contact is made, the flashing beacons on the trailer unit changes to a steady light as an indicator.

As a secondary feature, the tow vehicle and trailer units may each pivot at a point located in proximity to the ball and hitch respectively to facilitate aligning the vehicle to the trailer by bringing the markers relatively parallel to one another which aids the alignment where the driver has limited maneuverability of the vehicle. The use of the side view mirrors is seen as an advantage over systems that use the rear view mirror which could be blocked by stowage in the vehicle or rain or snow on the rear window, tinted windows, or rear seat passengers, whatever is implicated in preventing a line of sight to the alignment device. The stop point signal (or indicator) is seen as an advantage over systems that do not inform the driver when the tow ball is in the correct position under the trailer hitch to connect the two together. This allows the operator to concentrate on maneuvering the vehicle to the trailer correctly.

The system collapses compactly for storage. In a preferred embodiment, the support arms have hinged joints that allow collapsing them into a compact form, and will have methods such as snap-locks, pressure fits, handwheels, or springs to ensure that the unit can be fixed in the deployed position without collapsing during use. Other methods of collapsing the unit include making the support arms out of hollow extrusions of different nominal cross sections, the lesser fitted into the greater, so that they may collapse one another into a telescoping arm-like fashion. The hinged method is deemed superior when wiring is included for the signals since collapsing the telescoping embodiment could chafe the wires.

As value added features the units may be configured into roadside safety triangles with blinking lights or used as flashlights in emergency situations. Simple, standardized components are used throughout the system to facilitate inexpensive production and low inventory.

The units are generally fastened to the vehicle and trailer nominally perpendicular to the longitudinal axis of the vehicle and trailer respectively when the approach during reversing is generally coincident to the longitudinal axes of both the vehicle and trailer, although in certain situations where it is difficult or impossible for the vehicle to reverse coincident to the longitudinal axis of the trailer, where the approach is at an angle of attack where the longitudinal axes of both vehicle and trailer are not aligned but at an angle to one another, the operator can orient the trailer unit to be nominally parallel to the vehicle unit to allow the invention to function so that the orientation of the markers would be the same as if both the vehicle and trailer were in line with one another, and therefore the alignment of the ball and hitch would also be achieved.

An embodiment of the invention can be configured so that a pivot exists between the centrally located fastening means and the general body of the trailer unit to facilitate orienting the trailer unit to be parallel to the vehicle unit, even if the vehicle and trailer longitudinal axes are not in line. The trailer unit will generally be fastened at the hitch at the end of a long tongue or triangular brace that extends prominently from the trailer; the distance between the fastening point and the general body of the trailer allows the trailer unit to pivot generally 45 to 60 degrees to either side, allowing a wide range of configuration. Such a pivot will enable the operator or assistant to manually pivot the trailer unit to be parallel to the vehicle unit. As indicated, the vehicle may then advance to the hitch using the markers as reference as if the trailer was perfectly in line to the vehicle.

According to another aspect of the invention, there is provided a method of positioning a tow vehicle with respect to a trailer, comprising: locating a first marker on the tow vehicle a first predetermined transverse distance from the tow vehicle's longitudinal axis; locating a second marker on the trailer the first predetermined transverse distance from the trailer's longitudinal axis; and positioning the first marker with respect to the second marker by moving the tow vehicle.

The method might also include locating a third marker on the tow vehicle a second predetermined transverse distance from the tow vehicle's longitudinal axis and opposite the first marker; locating a fourth marker on the trailer the second predetermined transverse distance from the trailer's longitudinal axis and opposite the second marker; and positioning the third marker with respect to the fourth marker by moving the tow vehicle.

In this regard, positioning the first marker entails positioning the first marker so that the second marker appears with respect to the first marker to be no more than the first predetermined transverse distance from the tow vehicle's longitudinal axis and positioning the third marker comprises positioning the third marker so that the fourth marker appears with respect to the third marker to be no more than the second predetermined transverse distance from the tow vehicle's longitudinal axis. The proper position is achieved when the second marker appears with respect to the first marker to be the first predetermined transverse distance from the tow vehicle's longitudinal axis and the fourth marker appears with respect to the third marker to be the second predetermined transverse distance from the tow vehicle's longitudinal axis.

The first predetermined transverse distance might be greater than one half the width of the tow vehicle and the first predetermined transverse distance might be equal to the second predetermined transverse distance.

The first marker and the third marker might define between them a first line that is substantially orthogonal to the tow vehicle's longitudinal axis and the second marker and the fourth marker might be located so as to define between them a second line that is substantially parallel to the first line. The second line might be substantially orthogonal to the trailer's longitudinal axis.

The method might further include mounting at least one of the first marker and the third marker to a tow ball on the tow vehicle. Such mounting might include adjusting the separation along the vehicle's longitudinal axis between the tow ball and at least one of the first marker and the third marker. Similarly, the method might include mounting at least one of the second marker and the fourth marker to a trailer hitch on the trailer.

The method might also include detecting that the tow ball is proximate to the trailer hitch and activating an indicator, for example a light on the second marker, in response to detecting that the tow ball is proximate to the trailer hitch.

The method might further include removing the first, third, second, and fourth markers from the tow vehicle and the trailer respectively and perhaps collapsing the first, second, third and fourth markers for storage.

According to another aspect of the invention, there is provided an apparatus for positioning a tow vehicle with respect to a trailer. The apparatus includes: means for locating a first marker on the tow vehicle a first predetermined transverse distance from the tow vehicle's longitudinal axis and means for locating a second marker on the trailer the first predetermined transverse distance from the trailer's longitudinal axis, wherein the first marker is operable to be positioned with respect to the second marker by moving the tow vehicle.

The apparatus might further include means for locating a third marker on the tow vehicle a second predetermined transverse distance from the tow vehicle's longitudinal axis and opposite the first marker and means for locating a fourth marker on the trailer the second predetermined transverse distance from the trailer's longitudinal axis and opposite the second marker, wherein the third marker is operable to be positioned with respect to the fourth marker by moving the tow vehicle.

The apparatus might be such that the first marker is operable to be positioned so that the second marker appears with respect to the first marker to be no more than the first predetermined transverse distance from the tow vehicle's longitudinal axis and the third marker is operable to be positioned so that the fourth marker appears with respect to the third marker to be no more than the second predetermined transverse distance from the tow vehicle's longitudinal axis. The proper position is achieved when the second marker appears with respect to the first marker to be the first predetermined transverse distance from the tow vehicle's longitudinal axis and the fourth marker appears with respect to the third marker to be the second predetermined transverse distance from the tow vehicle's longitudinal axis.

In this regard, the first predetermined transverse distance may be greater than one half the width of the tow vehicle and the first predetermined transverse distance may be equal to the second predetermined transverse distance.

The first marker and the third marker may define between them a first line that is substantially orthogonal to the tow vehicle's longitudinal axis and the second marker and the fourth marker may be operable to be located so as to define between them a second line that is substantially parallel to the first line and substantially orthogonal to the trailer's longitudinal axis.

The apparatus may also include means for connecting at least one of the first marker and the third marker to a tow ball on the tow vehicle, perhaps including means for adjusting the separation along the vehicle's longitudinal axis between the tow ball and at least one of the first marker and the third marker. Similarly, the apparatus might include means for mounting at least one of the second marker and the fourth marker to a trailer hitch on the trailer.

The apparatus might also have an indicator, for example a light on the second marker; means for generating a detection signal in response to detecting that the tow ball is proximate to the trailer hitch; and means for activating the indicator in response to the detection signal.

The apparatus might be such that the means for locating the first marker and the third marker are releasable or the means for locating the second marker and the fourth marker are releasable, or even collapsible.

According to another aspect of the invention, there is provided an apparatus for positioning a tow vehicle with respect to a trailer, having a first marker located on the tow vehicle a first predetermined transverse distance from the tow vehicle's longitudinal axis and a second marker located on the trailer the first predetermined transverse distance from the trailer's longitudinal axis, wherein the first marker is operable to be positioned with respect to the second marker by moving the tow vehicle.

The apparatus might further include a third marker located on the tow vehicle a second predetermined transverse distance from the tow vehicle's longitudinal axis and opposite the first marker and a fourth marker located on the trailer the second predetermined transverse distance from the trailer's longitudinal axis and opposite the second marker, wherein the third marker is operable to be positioned with respect to the fourth marker by moving the tow vehicle.

In this regard, the first marker could be operable to be positioned so that the second marker appears with respect to the first marker to be no more than the first predetermined transverse distance from the tow vehicle's longitudinal axis and the third marker could be operable to be positioned so that the fourth marker appears with respect to the third marker to be no more than the second predetermined transverse distance from the tow vehicle's longitudinal axis. The proper position is indicated when the second marker appears with respect to the first marker to be the first predetermined transverse distance from the tow vehicle's longitudinal axis and the fourth marker appears with respect to the third marker to be the second predetermined transverse distance from the tow vehicle's longitudinal axis.

In this regard, the first predetermined transverse distance might be greater than one half the width of the tow vehicle and the first predetermined transverse distance might be equal to the second predetermined transverse distance.

In one embodies, the first marker and the third marker define between them a first line that is substantially orthogonal to the tow vehicle's longitudinal axis and the second marker and the fourth marker may be operable to be located so as to define between them a second line that is substantially parallel to the first line and desirably substantially orthogonal to the trailer's longitudinal axis.

The apparatus might further include a connector adapted to connect at least one of the first marker and the third marker to a tow ball on the tow vehicle, perhaps including an adjustment device operable to adjust the separation along the vehicle's longitudinal axis between the tow ball and at least one of the first marker and the third marker. The apparatus might also include a hitch mount adapted to mount at least one of the second marker and the fourth marker to a trailer hitch on the trailer.

In another embodiment, the apparatus might also include: an indicator, for example a light on the second marker; a hinged paddle depending from the trailer hitch and operable to temporarily pivot from a rest position to a detection position upon the urging of the tow ball; and a switch, connected to activate the indicator in response to the hinged paddle being in the detection position.

The first marker and the second marker might be retained on a support extending transversely from respectively the towing vehicle's longitudinal axis and the trailer's longitudinal axis, the support perhaps including a principle support arm and at least one of a distal support arm and a medial support arm. Adjacent support arms might be connected together by a hinge joint that is operable to lock the adjacent support arms in parallel disposition, the hinge joint possibly including a handwheel to aid in such locking. The support might be adapted to disengage from at least one of the towing vehicle and the trailer and desirably the adjacent support arms might be rotated at the hinge to collapse the support for storage.

According to yet another aspect of the present invention, there is provided an apparatus for positioning a tow vehicle, comprising a first marker located on the tow vehicle a first predetermined transverse distance from the tow vehicle's longitudinal axis and a trailer having a second marker located the first predetermined transverse distance from the trailer's longitudinal axis, wherein the first marker is operable to be positioned with respect to the second marker by moving the tow vehicle.

The apparatus also be characterized as having a third marker located on the tow vehicle a second predetermined transverse distance from the tow vehicle's longitudinal axis and opposite the first marker, wherein the trailer has a fourth marker located the second predetermined transverse distance from the trailer's longitudinal axis and opposite the second marker and wherein the third marker is operable to be positioned with respect to the fourth marker by moving the tow vehicle.

According to still another aspect of the invention, there is provided an apparatus for aligning with a trailer, comprising a tow vehicle having a first marker located a first predetermined transverse distance from the tow vehicle's longitudinal axis and a second marker located on the trailer the first predetermined transverse distance from the trailer's longitudinal axis, wherein the first marker is operable to be positioned with respect to the second marker by moving the tow vehicle.

The apparatus might also be characterized as having a fourth marker located on the trailer the second predetermined transverse distance from the trailer's longitudinal axis and opposite the second marker, wherein the tow vehicle has a third marker located a second predetermined transverse distance from the tow vehicle's longitudinal axis and opposite the first marker, and wherein the third marker is operable to be positioned with respect to the fourth marker by moving the tow vehicle.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar elements and/or features may have the same reference label.

1. BRIEF DESCRIPTION OF THE DRAWINGS

| | |
|---|---|
| FIG. 1 | is a top-rear-right perspective view of an embodiment of one aspect of the present invention, including a tow vehicle unit attached to a tow vehicle and a trailer unit attached to a trailer; |
| FIG. 2 | is a detailed top-front-right perspective view of the tow vehicle unit of FIG. 1; |
| FIG. 3 | is a detailed top-front-right perspective view of the trailer unit of FIG. 1; |
| FIG. 4 | is a front elevational view of the embodiment of FIG. 1, wherein the tow vehicle and the trailer are aligned but not proximate for coupling; |
| FIG. 5 | is a front elevational view of the embodiment of FIG. 1, wherein the tow vehicle and the trailer are both aligned and proximate for coupling; |
| FIG. 6 | is a right elevational view of the embodiment of FIG. 1, wherein the tow vehicle and the trailer are aligned but not proximate for coupling; |
| FIG. 7 | is a detailed right elevational view of the embodiment of FIG. 6, wherein the tow vehicle and the trailer are aligned but not proximate for coupling; and |
| FIG. 8 | is a detailed right elevational view of the embodiment of FIG. 5, wherein the tow vehicle and the trailer are both aligned and proximate for coupling. |

2. DETAILED DESCRIPTION OF SPECIFIC EMBODIMENTS

The structure and operation of the invention will now be illustrated by explanation of specific, non-limiting, exemplary embodiments shown in the drawing figures and described in greater detail herein.

Figure 1:
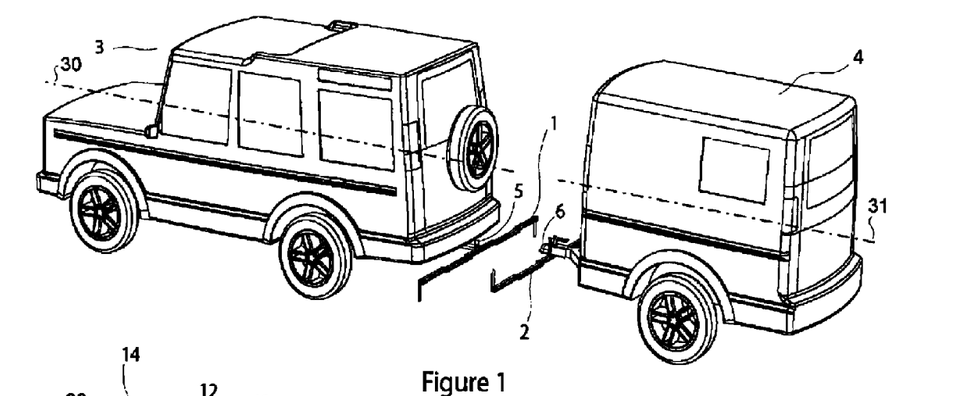

FIG. 1 shows a tow vehicle 3 and a trailer 4 during the process of aligning the tow ball 5 of the tow vehicle 3 with the trailer hitch 6 of the trailer 4 by means of viewing through the side view mirrors 22 a tow vehicle unit 1 at the tow ball 5 and a trailer unit 2 at the trailer hitch 6.

Markers 15 at either end of the tow vehicle unit 1 and the trailer unit 2 are deployed to allow a driver of the tow vehicle 3 to see them through the side view mirrors 22 of the tow vehicle 3 so that when reversing the markers 15 on the tow vehicle unit 1 can be aligned with the markers 15 on the trailer unit 2, giving the driver a visual reference of where to align the moving tow vehicle 3 relative to the stationary trailer 4. The invention helps the driver to reverse the tow vehicle 3 toward the trailer 4 using the side view mirrors 22 of the tow vehicle 3 without relying on the rear view mirror of the tow vehicle 3 whose view may be blocked by obstacles 23 (not part of the invention) such as a rear mounted spare tire, a back seat passenger, or a dirty rear window.

Figures 2, 3:
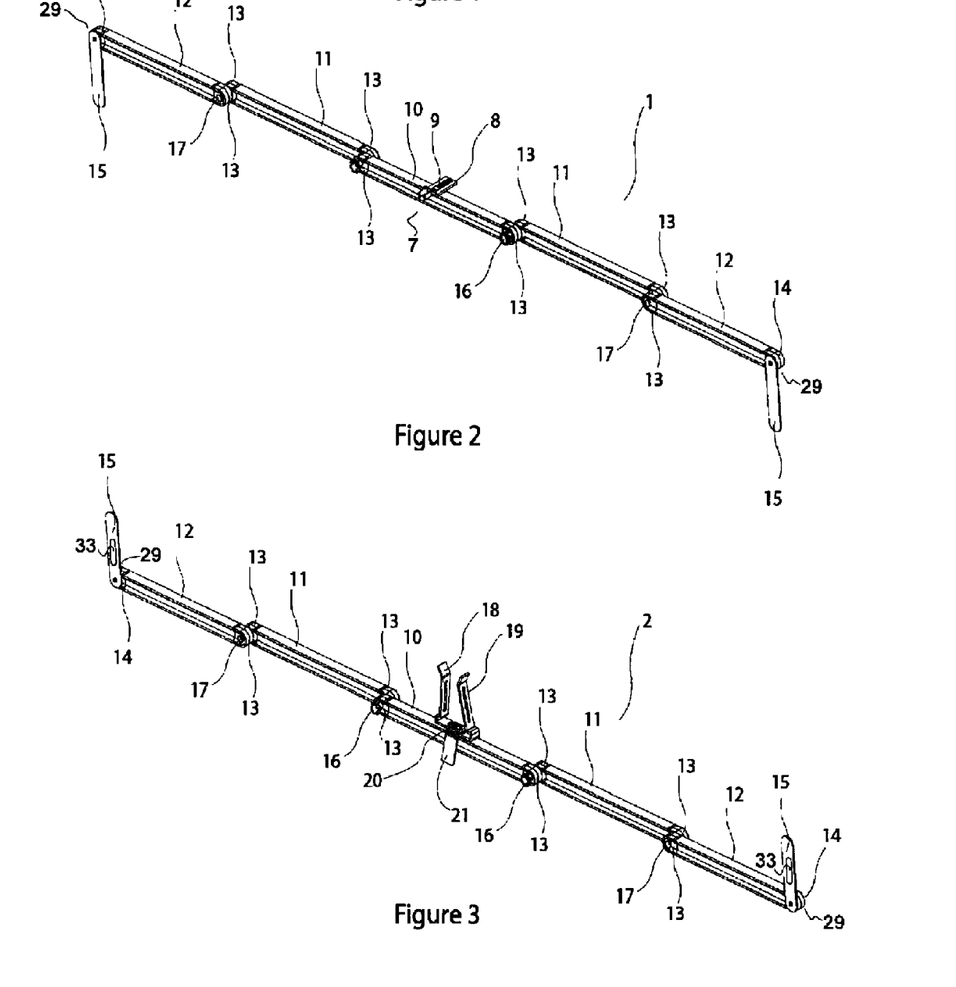

FIG. 2 shows a perspective view of the tow vehicle unit 1. The tow vehicle unit 1 comprises a connector 7 such as a friction fit clip that is fastened to the neck 28 (best seen in FIG. 7) of the tow ball 5 of the tow vehicle 3. The connector 7 is disposed equidistant between the distal ends 29 of the tow vehicle unit 1 to permit the proper balance of the tow vehicle unit 1 and effect being a visual guide where both distal ends 29 are equally visible through respective side view mirrors 22.

The connector 7 is supported by an adjustment device 8 that permits the tow vehicle unit 1 to be adjusted along the tow vehicle's longitudinal axis 30 to permit clearing the bumper or other posterior obstructions on the tow vehicle 3. The adjustment device 8 is mounted to a principle support arm 10 of the tow vehicle unit 1 by a fastening means 9, such as a bolt fastened to the principle support arm 10 that can be loosened to allow adjustment of the adjustment device 8.

Extending equally on either side of the principle support arm 10 are medial support arms 11, and extending from each of the medial support arms 11 are distal support arms 12, the furthest portions of these being the distal ends 29 where upon are mounted the markers 15. The purpose of the medial support arms 11 and distal support arms 12 is to allow the tow vehicle unit 1 to collapse into a compact form for storage; the tow vehicle unit 1 would function equally well without them should the principle support arm 10 be extended equally to either side of the tow vehicle 3 where the markers 15 at distal ends 29 could be viewed through the side view mirrors 22.

The medial support arms 11 are attached to the principle support arm 10 by hinged joints 13; likewise the distal support arms 12 are attached to the medial support arms 11 by hinged joints 13. In this regard, the ends of the principle support arm 10, the medial support arms 11, and distal support arms 12, where pivoting is required, each terminate in a hinged joint 13.

These hinged joints 13 can be fashioned to have an internal mechanism (not illustrated) to lock them in place when the arms 10, 11, 12 are deployed for use, or they may use a handwheel 16 to be operated by the user to tighten the hinged joints 13 together to lock the deployed arms 10, 11, 12 in place. A strong pivot rod 17, for example a bolt, may be used as a pivot means for the hinged joints 13, or they may have their own internal pivot means such as a snap-fit detail (not illustrated). Alternatively, the handwheel 16 could be fashioned with a portion extending therefrom that functions as a pivot rod 17.

The distal support arms 12 are shown terminating in end caps 14 that support the markers 15. The markers 15 on the tow vehicle unit 1 are shown pointing down so as not to collide with corresponding upwardly pointing markers 15 on the trailer unit 2, when the two are brought into alignment ad proximity with each other during use.

FIG. 3 depicts the trailer unit 2 with similar elements to the tow vehicle unit 1, including the principle support arm 10, medial support arms 11, distal support arms 12, hinged joints 13, end caps 14, markers 15, handwheels 16, and pivot rods 17, that connect together in a similar fashioned as described in FIG. 2. The markers 15 on the trailer unit 2 are shown pointing up so as not to collide with the markers 15 on the tow vehicle unit 1 when the two are brought into alignment and proximity with each other during use.

The trailer unit 2 however is mounted to the trailer hitch 6 by a different arrangement than the tow vehicle unit 1 is mounted to the tow ball 5. A left hitch mount 18 and a right hitch mount 19 are disposed to move to the left and right to permit being closed onto the trailer hitch 6 where they hold the trailer unit 2 in place. The trailer unit 2 is mounted to the trailer hitch 6 using the left hitch mount 18 and right hitch mount 19 at a position that enables use of the invention. Other mounting arrangements are available; however, the advantage of the left hitch mount 18 and right hitch mount 19 are that they are shaped to fit around a typical trailer hitch 6, thereby holding the trailer unit 2 in place by mechanical fit.

A secondary advantage is to have the left hitch mount 18 and right hitch mount 19 fastenable to the trailer unit 2 centrally to the principle support arm 10 by a pivot 20 so that the trailer unit 2 can be adjusted by a user to be parallel to the tow vehicle unit 1 in cases where the driver is not able to align the tow vehicle's longitudinal axis 30 to the trailer's longitudinal axis 31. The driver should adjust the trailer unit 2 parallel to the tow vehicle unit 1, and if possible both generally perpendicular to their respective longitudinal axes, so that the markers 15 on either unit 1, 2 can be seen through the side view mirrors 22. As these markers 15 are equidistant to either side of their respective units 1, 2, and the markers 15 of one unit 1, 2 is equidistant to those of the other unit 1, 2, the driver may use them as guides to bring the tow vehicle 3 in proximity to the trailer 4 in efforts to guide the tow ball 5 to a proper position for coupling to the trailer hitch 6.

Figure 4:
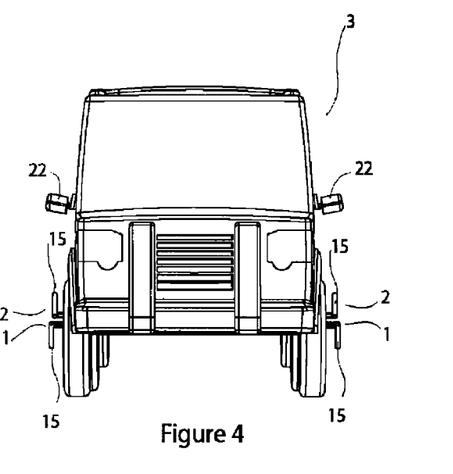

FIG. 4 shows a front elevational view of the same tow vehicle 3 and trailer 4 in the same respective positions as shown in FIG. 1. The markers 15, as seen on the distal ends 29 of the tow vehicle unit 1 and the trailer unit 2 can be viewed by the driver through the side view mirrors 22 on either side of the tow vehicle 3, despite not being able to see the actual trailer 4, or the tow ball 5 or trailer hitch 6.

Figure 5:
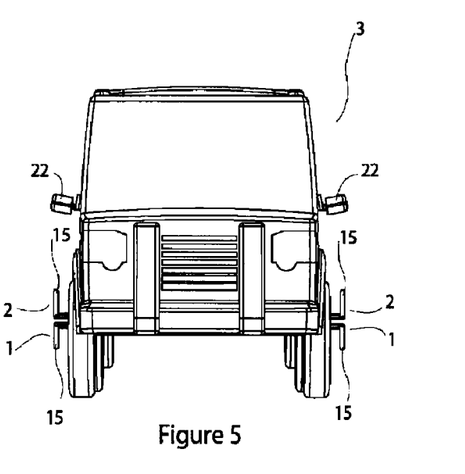
Figure 8:
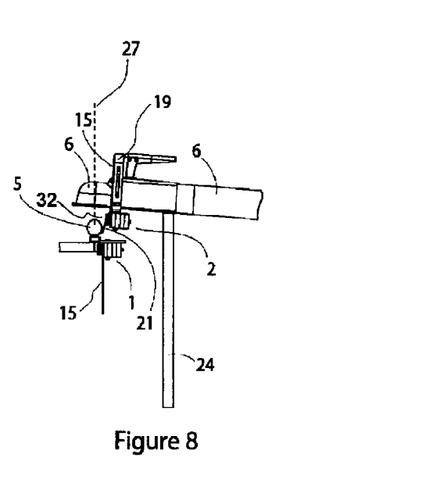

Therefore, these markers 15 act to guide the tow ball 5 to the trailer hitch 6. When the tow vehicle unit 1 is aligned to the trailer unit 2 such that they are parallel but where the trailer hitch 6 is further back from the tow ball 5, the markers 15 on the trailer unit 2 appear between the markers 15 on the tow vehicle unit 1 because of diminishing perspective. This will be the guide that first allows a driver to target the tow vehicle 3 to the trailer 4, then permit reversing the tow vehicle 3 in a manner such that the left hand markers 15 on both units 1, 2 line up together, and the right hand markers 15 on both units 1, 2 line up together, thereby indicating a perfect alignment, as shown in FIGS. 5 and 8. At this point the tow ball 5 should be directly in position under the trailer hitch 6 ready for coupling. A dotted datum line 27 is shown in FIG. 8 to indicate the proper stop point.

FIGS. 1, 4, 6, and 7 depict the same point in time during the procedure, as viewed from different positions. FIGS. 5 and 8 likewise depict the same point in time during the procedure, where the tow ball 5 has reached the stop point where it is in proper position to be coupled with the trailer hitch 6, as viewed from different positions.

Figure 7:
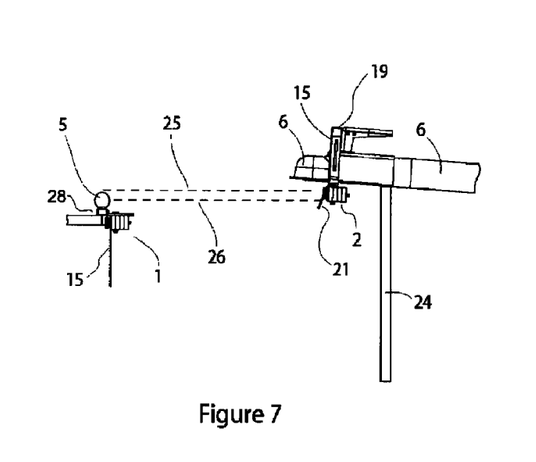

FIG. 7 is a detailed right elevational view of the positions of the tow ball and trailer hitch 6 at a point during the procedure where the driver is reversing the tow ball 5 toward the stop point at the trailer hitch 6. FIG. 8 is a detailed right elevational view where the tow ball 5 has reached the stop point at the trailer hitch 6.

Figure 6:
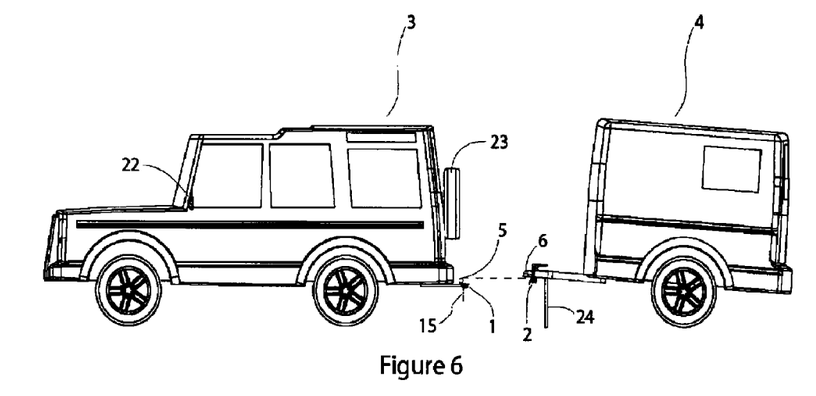

FIG. 6 shows a right elevational view of the tow vehicle 3 and trailer 4 where the tow vehicle's longitudinal axis 30 is in line with the trailer's longitudinal axis 31. The trailer hitch 6 of the trailer 4 is elevated with a support 24, such as a jack for such purposes or bricks or blocks of wood, that permit the trailer hitch 6 to be elevated enough to permit the line of passage 25 of the tow ball 5 under the trailer hitch 6 so as to permit the tow ball 5 to reach the stop point below the trailer hitch 6 so that the trailer hitch 6 can then be lowered onto the tow ball 5, effectively coupling the two elements.

FIG. 7 shows a detail of this position of the elevated trailer hitch 6 supported by the support 24 where the top of the tow ball 5 can follow the line of passage 25 clearly below the bottom of the trailer hitch 6 so as to be able to proceed without obstruction to the stop point below the trailer hitch 6. A hinged paddle 21 attached to the trailer unit 2 is present at the stop point so that the tow ball 5, following the line of travel 26, coincident to the center of the tow ball 5 and the hinged paddle 21, will strike the hinged paddle 21 at the stop point.

As seen in FIG. 8, the hinged paddle 21 depresses when the tow ball 5 strikes it at the stop point, triggering a switch 32 that causes indicator lights 33 at the distal ends 29 of the trailer unit 2 to illuminate. The indicator lights 33 can be seen by the driver of the tow vehicle 3 through the side view mirrors 22, as best seen in the front elevational views of FIGS. 4 and 5. Since the depressed hinged paddle 21 triggers the switch 32 when the tow ball 5 depresses it at the stop point causing the indicator lights 33 to illuminate, the driver has a secondary form of feedback, in addition to the aligned markers 15 of the tow vehicle unit 1 and the trailer unit 2, that indicates when the tow ball 5 is at the stop point below the trailer hitch 6, where the tow ball 5 and trailer hitch 6 can now be coupled. The hinged paddle 21 is seen as facilitating the triggering action of the switch 32 when the tow ball 5 is at the stop point by being a larger target for the tow ball 5 to strike; however, the tow ball 5 could just the same strike the switch 32 directly at the stop point.

Thus, it will be seen from the foregoing embodiments and examples that there has been described a way of assisting a driver of a tow vehicle 3 to reverse the tow vehicle 3 into alignment and proximity with a trailer 4, so that the tow vehicle 3 and the trailer 4 can be easily hitched together.

While specific embodiments of the invention have been described and illustrated, such embodiments should be considered illustrative of the invention only and not as limiting the invention as construed in accordance with the accompanying claims. For example, so long as the markers 15 may be aligned as described herein, they might be directly mounted to or incorporated into the tow vehicle 3 and/or the trailer 4 instead of the tow ball 5 and/or the trailer hitch 6 respectively.

It will be understood by those skilled in the art that various changes, modifications and substitutions can be made to the foregoing embodiments without departing from the principle and scope of the invention expressed in the claims made herein.

TABLE OF REFERENCES

| Element(s) | Reference | Total count | Page and line |
|---|---|---|---|
| tow vehicle unit | 1 | 21 | Page 25 line 12 |
| | | | Page 25 line 14 |
| | | | Page 25 line 16 |
| | | | Page 26 line 1 |
| | | | Page 26 line 1 |
| | | | Page 26 line 4 |
| | | | Page 26 line 5 |
| | | | Page 26 line 9 |

-continued

TABLE OF REFERENCES

| Element(s) | Reference | Total count | Page and line |
|---|---|---|---|
| | | | Page 26 line 11 |
| | | | Page 26 line 19 |
| | | | Page 26 line 20 |
| | | | Page 27 line 15 |
| | | | Page 27 line 19 |
| | | | Page 28 line 1 |
| | | | Page 28 line 4 |
| | | | Page 28 line 15 |
| | | | Page 28 line 17 |
| | | | Page 29 line 5 |
| | | | Page 29 line 10 |
| | | | Page 29 line 12 |
| | | | Page 31 line 8 |
| trailer unit | 2 | 19 | Page 25 line 13 |
| | | | Page 25 line 14 |
| | | | Page 25 line 17 |
| | | | Page 27 line 17 |
| | | | Page 27 line 19 |
| | | | Page 27 line 23 |
| | | | Page 28 line 3 |
| | | | Page 28 line 6 |
| | | | Page 28 line 7 |
| | | | Page 28 line 11 |
| | | | Page 28 line 13 |
| | | | Page 28 line 14 |
| | | | Page 28 line 17 |
| | | | Page 29 line 5 |
| | | | Page 29 line 10 |
| | | | Page 29 line 12 |
| | | | Page 30 line 20 |
| | | | Page 31 line 3 |
| | | | Page 31 line 9 |
| unit | 1, 2 | 3 | Page 28 line 19 |
| | | | Page 28 line 21 |
| | | | Page 28 line 21 |
| units | 1, 2 | 3 | Page 28 line 20 |
| | | | Page 29 line 15 |
| | | | Page 29 line 16 |
| tow vehicle | 3 | 22 | Page 25 line 10 |
| | | | Page 25 line 11 |
| | | | Page 25 line 15 |
| | | | Page 25 line 16 |
| | | | Page 25 line 18 |
| | | | Page 25 line 19 |
| | | | Page 25 line 20 |
| | | | Page 25 line 21 |
| | | | Page 26 line 3 |
| | | | Page 26 line 10 |
| | | | Page 26 line 22 |
| | | | Page 28 line 22 |
| | | | Page 29 line 3 |
| | | | Page 29 line 7 |
| | | | Page 29 line 14 |
| | | | Page 29 line 15 |
| | | | Page 30 line 8 |
| | | | Page 31 line 4 |
| | | | Page 31 line 16 |
| | | | Page 31 line 17 |
| | | | Page 31 line 18 |
| | | | Page 32 line 1 |
| trailer | 4 | 13 | Page 25 line 10 |
| | | | Page 25 line 11 |
| | | | Page 25 line 19 |
| | | | Page 25 line 20 |
| | | | Page 29 line 1 |
| | | | Page 29 line 4 |
| | | | Page 29 line 7 |
| | | | Page 29 line 14 |
| | | | Page 30 line 8 |
| | | | Page 30 line 10 |
| | | | Page 31 line 17 |
| | | | Page 31 line 18 |
| | | | Page 32 line 1 |
| tow ball | 5 | 27 | Page 25 line 11 |
| | | | Page 25 line 13 |
| | | | Page 26 line 3 |
| | | | Page 28 line 4 |
| | | | Page 29 line 1 |
| | | | Page 29 line 7 |
| | | | Page 29 line 9 |
| | | | Page 29 line 11 |
| | | | Page 29 line 18 |
| | | | Page 29 line 23 |
| | | | Page 30 line 3 |
| | | | Page 30 line 5 |
| | | | Page 30 line 6 |
| | | | Page 30 line 12 |
| | | | Page 30 line 13 |
| | | | Page 30 line 14 |
| | | | Page 30 line 17 |
| | | | Page 30 line 20 |
| | | | Page 30 line 21 |
| | | | Page 31 line 1 |
| | | | Page 31 line 6 |
| | | | Page 31 line 9 |
| | | | Page 31 line 10 |
| | | | Page 31 line 12 |
| | | | Page 31 line 13 |
| | | | Page 31 line 13 |
| | | | Page 32 line 1 |
| trailer hitch | 6 | 26 | Page 25 line 11 |
| | | | Page 25 line 13 |
| | | | Page 28 line 3 |
| | | | Page 28 line 6 |
| | | | Page 28 line 7 |
| | | | Page 28 line 11 |
| | | | Page 29 line 2 |
| | | | Page 29 line 8 |
| | | | Page 29 line 9 |
| | | | Page 29 line 11 |
| | | | Page 29 line 18 |
| | | | Page 30 line 1 |
| | | | Page 30 line 4 |
| | | | Page 30 line 5 |
| | | | Page 30 line 7 |
| | | | Page 30 line 10 |
| | | | Page 30 line 11 |
| | | | Page 30 line 13 |
| | | | Page 30 line 14 |
| | | | Page 30 line 14 |
| | | | Page 30 line 16 |
| | | | Page 30 line 18 |
| | | | Page 30 line 19 |
| | | | Page 31 line 10 |
| | | | Page 31 line 10 |
| | | | Page 32 line 1 |
| connector | 7 | 3 | Page 26 line 2 |
| | | | Page 26 line 4 |
| | | | Page 26 line 8 |
| adjustment device | 8 | 3 | Page 26 line 8 |
| | | | Page 26 line 11 |
| | | | Page 26 line 13 |
| fastening means | 9 | 1 | Page 26 line 12 |
| principle support arm | 10 | 8 | Page 26 line 11 |
| | | | Page 26 line 12 |
| | | | Page 26 line 15 |
| | | | Page 26 line 21 |
| | | | Page 27 line 1 |
| | | | Page 27 line 4 |
| | | | Page 27 line 20 |
| | | | Page 28 line 13 |
| medial support arms | 11 | 7 | Page 26 line 16 |
| | | | Page 26 line 16 |
| | | | Page 26 line 18 |
| | | | Page 27 line 1 |
| | | | Page 27 line 3 |
| | | | Page 27 line 4 |
| | | | Page 27 line 20 |
| distal support arms | 12 | 6 | Page 26 line 17 |
| | | | Page 26 line 19 |

-continued

TABLE OF REFERENCES

| Element(s) | Reference | Total count | Page and line |
|---|---|---|---|
| | | | Page 27 line 2 |
| | | | Page 27 line 4 |
| | | | Page 27 line 14 |
| | | | Page 27 line 20 |
| hinged joints | 13 | 6 | Page 27 line 2 |
| | | | Page 27 line 3 |
| | | | Page 27 line 6 |
| | | | Page 27 line 9 |
| | | | Page 27 line 10 |
| | | | Page 27 line 21 |
| arms | 10, 11, 12 | 2 | Page 27 line 7 |
| | | | Page 27 line 9 |
| hinged joint | 13 | 1 | Page 27 line 5 |
| end caps | 14 | 2 | Page 27 line 14 |
| | | | Page 27 line 21 |
| markers | 15 | 22 | Page 25 line 14 |
| | | | Page 25 line 16 |
| | | | Page 25 line 17 |
| | | | Page 26 line 18 |
| | | | Page 26 line 22 |
| | | | Page 27 line 15 |
| | | | Page 27 line 15 |
| | | | Page 27 line 16 |
| | | | Page 27 line 21 |
| | | | Page 27 line 23 |
| | | | Page 28 line 1 |
| | | | Page 28 line 19 |
| | | | Page 28 line 20 |
| | | | Page 28 line 21 |
| | | | Page 29 line 4 |
| | | | Page 29 line 9 |
| | | | Page 29 line 12 |
| | | | Page 29 line 12 |
| | | | Page 29 line 15 |
| | | | Page 29 line 16 |
| | | | Page 31 line 8 |
| | | | Page 31 line 22 |
| handwheel | 16 | 2 | Page 27 line 8 |
| | | | Page 27 line 12 |
| handwheels | 16 | 1 | Page 27 line 21 |
| pivot rod | 17 | 2 | Page 27 line 10 |
| | | | Page 27 line 13 |
| pivot rods | 17 | 1 | Page 27 line 22 |
| left hitch mount | 18 | 4 | Page 28 line 4 |
| | | | Page 28 line 7 |
| | | | Page 28 line 9 |
| | | | Page 28 line 12 |
| right hitch mount | 19 | 4 | Page 28 line 5 |
| | | | Page 28 line 8 |
| | | | Page 28 line 10 |
| | | | Page 28 line 12 |
| pivot | 20 | 1 | Page 28 line 14 |
| hinged paddle | 21 | 6 | Page 30 line 19 |
| | | | Page 30 line 22 |
| | | | Page 30 line 22 |
| | | | Page 31 line 1 |
| | | | Page 31 line 6 |
| | | | Page 31 line 11 |
| side view mirrors | 22 | 8 | Page 25 line 12 |
| | | | Page 25 line 15 |
| | | | Page 25 line 20 |
| | | | Page 26 line 7 |
| | | | Page 26 line 23 |
| | | | Page 28 line 19 |
| | | | Page 29 line 6 |
| | | | Page 31 line 4 |
| obstacles | 23 | 1 | Page 25 line 22 |
| support | 24 | 2 | Page 30 line 10 |
| | | | Page 30 line 17 |
| line of passage | 25 | 2 | Page 30 line 12 |

-continued

TABLE OF REFERENCES

| Element(s) | Reference | Total count | Page and line |
|---|---|---|---|
| | | | Page 30 line 17 |
| line of travel | 26 | 1 | Page 30 line 21 |
| datum line | 27 | 1 | Page 29 line 19 |
| neck | 28 | 1 | Page 26 line 3 |
| distal ends | 29 | 6 | Page 26 line 4 |
| | | | Page 26 line 6 |
| | | | Page 26 line 17 |
| | | | Page 26 line 22 |
| | | | Page 29 line 5 |
| | | | Page 31 line 3 |
| tow vehicle's longitudinal axis | 30 | 3 | Page 26 line 9 |
| | | | Page 28 line 15 |
| | | | Page 30 line 9 |
| trailer's longitudinal axis | 31 | 2 | Page 28 line 16 |
| | | | Page 30 line 9 |
| switch | 32 | 4 | Page 31 line 2 |
| | | | Page 31 line 6 |
| | | | Page 31 line 12 |
| | | | Page 31 line 14 |
| indicator lights | 33 | 3 | Page 31 line 2 |
| | | | Page 31 line 3 |
| | | | Page 31 line 7 |

What is claimed is:

1. An apparatus for positioning a tow vehicle with respect to a trailer, comprising a tow vehicle unit and a trailer unit;
   wherein each of the tow vehicle unit and the trailer unit comprises two medial support arms attached to a principle support arm by hinged joints and two distal support arms attached to the medial supports arms by hinged joints; wherein the principle support arm, the medial support arms, and the distal support arms extend transversely from the longitudinal axis of the tow vehicle unit or trailer unit respectively;
   wherein a distal end of each distal support arm terminates in an end cap that supports a marker;
   wherein the tow vehicle unit is attached to a tow ball of a vehicle and the trailer unit is attached to a trailer hitch of a trailer; and
   wherein when the tow vehicle unit and trailer unit are lined up, the markers on the distal ends of the distal support arms of the tow vehicle unit and the trailer unit are aligned longitudinally such that they do not collide with each other during use.

2. The apparatus of claim 1, wherein the tow vehicle unit is attached to the tow ball with a connector supported by an adjustment device that permits the tow vehicle unit to be adjusted along a longitudinal axis of the tow vehicle to permit clearing of a bumper or other posterior obstruction on the tow vehicle; and
   wherein the adjustment device is mounted to the principle support arm of the tow vehicle unit.

3. The apparatus of claim 1, wherein the trailer unit further comprises a hinged paddle that depresses when the tow ball of the vehicle strikes it, thereby triggering a switch that causes indicator lights at the distal ends of the distal supports arms of the trailer unit to illuminate.

4. The apparatus of claim 3, wherein the indicator lights are located inside the markers on the distal ends of the distal support arms of the trailer unit.

* * * * *